May 5, 1925.
J. W. M. DU MOND
CALCULATING DEVICE
Filed July 7, 1924     2 Sheets-Sheet 1
1,536,574
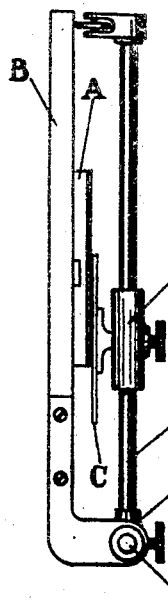
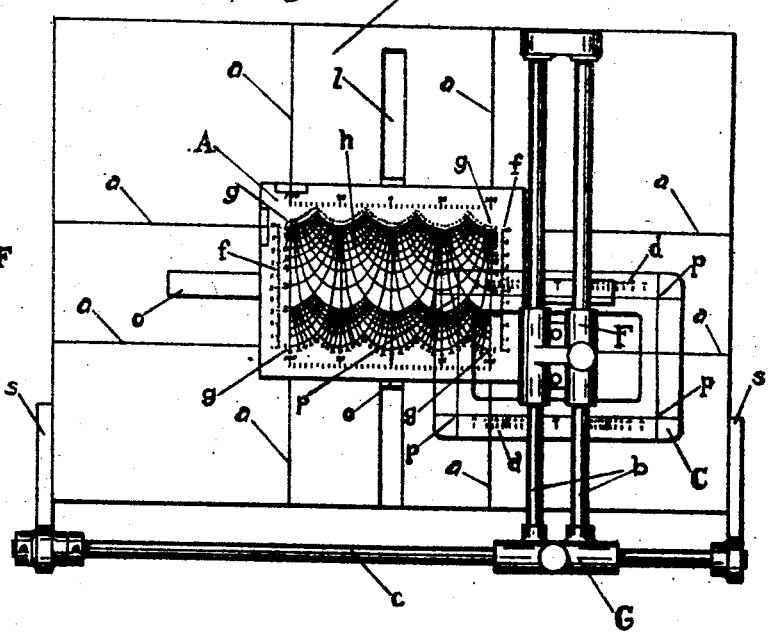
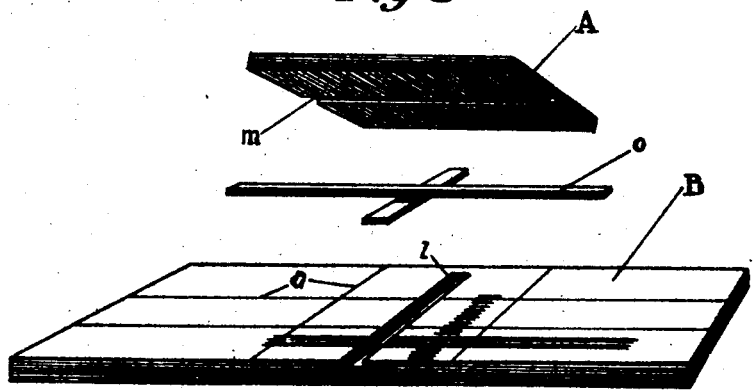
WITNESSES
Jesse W. M. DuMond   INVENTOR
By John A. Helliwell
ATTORNEY May 5, 1925.

J. W. M. DU MOND
CALCULATING DEVICE
Filed July 7, 1924

WITNESSES:
J. Harold Hopkins
W. Bloom

Jesse W. M. DuMond INVENTOR

BY
John O. Helliwell ATTORNEY

Patented May 5, 1925.

1,536,574

UNITED STATES PATENT OFFICE.

JESSE WILLIAM MUNROE DU MOND, OF PASADENA, CALIFORNIA.

CALCULATING DEVICE.

Application filed July 7, 1924. Serial No. 724,741.

*To all whom it may concern:*

Be it known that I, JESSE WILLIAM MUNROE DU MOND, a citizen of the United States, residing at Pasadena, in the county of Los Angeles and State of California, have invented a new and useful Calculating Device, of which the following is a full, clear, concise, and exact description.

My invention relates to numerical calculating devices and more especially to devices adapted to calculations involving the generalized algebraic numbers known as complex-imaginary numbers.

One of the objects of this invention is to provide a means of rapidly solving problems of electrical engineering relating to varying and alternating currents, the circuits in which they flow, and related subjects.

This invention is not, however, restricted to this application as the type of numerical quantity to the calculation of which it is adapted is very broad including the ordinary numbers as a special case and offering practical applications in many branches of engineering, physics, and mathematics.

In this application the term "complex-imaginary number" is used to indicate a numerical symbol of the type-form A plus $i$B, or any other number which can be reduced to this type-form where A and B are each understood to be any "real" number (whole or fractional), negative or positive, rational or irrational, commensurable or incommensurable), and "$i$" is understood to stand for a quantity such that its square equals negative unity. The special case in which either A or B assumes the value zero is considered to be also a complex-imaginary number.

My invention will be better understood from the following description taken in conjunction with the accompanying drawings, and its scope will be pointed out in the appended claims.

In the drawings Fig. 1 is a plan of the device.

Fig. 2 is an elevation or end view.

Fig. 3 is an explanatory view showing one manner of constructing the essential operative elements of my invention.

Figure 4:
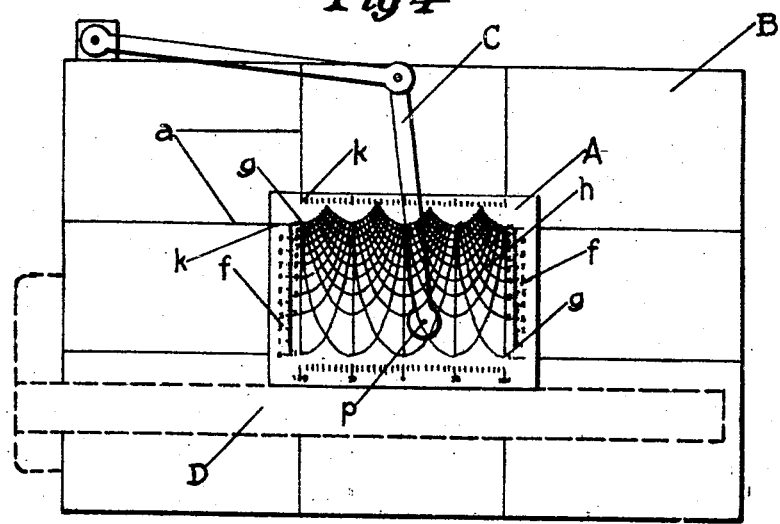
Fig. 4 shows the operative elements embodied and combined in a much simpler form.

Referring to Fig. 1, B is the basic rectilinear coordinate chart having two pairs of rectilinear coordinates $a$, the intersections of which form points of origin to which the fiduciary points $g$ on chart A may be made to coincide during the alternate movements of chart A and the indicator. Chart A has the system of curvilinear coordinates $h$ and scales of equal divisions $f$ and fiduciary points $g$. By placing the reference marks $k$ of chart A in coincidence with the rectilinear coordinates $a$ of chart B the fiduciary points $g$ of chart A will coincide with the intersection of the rectilinear coordinates. The adjustable indicator C has the fiduciary markings $p$ and also cosine scales if desired. The indicator C is attached to a slide element F which is movable along the guides $b$ and by the use of a set-screw or some such means may be locked on the guides. The guides $b$ are joined integrally with the carriage G, which is movable along the guide rail $c$ and is provided with a set-screw or some such locking device. The guide rail $c$ is rotatable in the fixed mounting $s$ attached to the base of chart B. When the indicator slide F and carriage G are both locked in position their combined elements may be turned on the guide rail $c$ as a pivot and swung out of the way while interchangeable curvilinear charts are substituted and again returned to the former operative position. The movement of the indicator slide and carriage provides a motion of pure translation of the indicator relative to the charts. The diagrammatic Fig. 3 shows the slots $l$ and $m$ more fully described later, in the bases of charts B and A respectively, these slots coacting with the cross-arm element.

The above outlined arrangements are to be considered suggestive rather than exhaustive or conclusive and are subject to such modification as may be deemed advisable to attain the purposes hereinafter set forth.

To convey a better comprehension of the nature of my invention I will state that it bears some analogies to the ordinary engineer's slide-rule if that instrument be conceived as amplified into two dimensions.

In the form shown in the drawings my invention permits of:

1. Obtaining the product of two or more complex-imaginary numbers.

2. Obtaining the quotient of two complex-imaginary numbers.

3. Obtaining all powers of complex-imaginary numbers.

4. Obtaining all roots of complex-imaginary numbers.

5. Obtaining the logarithms of complex-imaginary numbers.

6. Obtaining the modulus and argument of any complex-imaginary number given its real and imaginary components and the reverse operation of this computation.

7. Performing rapidly combinations of the above operations.

8. Performing many operations of special application in the sciences, of which a single example is the direct reading of phase angles and power factors in alternating current calculations.

By slight modifications of form hereinafter mentioned my invention also permits of performing all the above mentioned operations upon certain mathematical functions of complex-imaginary numbers such as trigonometric, hyperbolic, and exponential functions.

No reference will be made in this application to the general and applied theory of complex-imaginary numbers which has already been extensively exposed and can be found in works on algebra, trigonometry, differential and integral calculus, complex variables, mathematical physics and electrical engineering.

Terminology in general use by mathematicians, physicists and engineers will be here employed. It differs slightly from that used by electrical engineers proper in that these latter sometimes substitute the letter "$j$" for the letter "$i$," the word "vector" for the words "complex-imaginary," the words "scalar value" for the word "modulus" and the words "phase-angle" for the word "argument."

The principle upon which my invention operates is that of the graphical addition of the logarithms of complex-imaginary numbers. The logarithm of a complex-imaginary number is itself another complex-imaginary number. The following explanation is intended to make clear the meaning of the words "graphical addition" as applied to complex-imaginary numbers. Let two complex-imaginary numbers to be added be each graphically represented by the position of a point in a plane relative to two mutually rectangular straight reference lines by making in each case the "$x$" and "$y$" coordinates (in the well known terminology of analytical geometry) of a point referred to its own reference lines measured in terms of some chosen unit of length numerically equal to the real and imaginary components respectively of the complex-imaginary number to be represented by that point. If, now, the intersection of coordinates or origin of the first system be made to coincide with the point representing the complex-imaginary number in the second system while the reference axis of the first system be maintained parallel to the corresponding axis of the second system then will the point which in the first system represents the first complex-imaginary number represent the sum of the two complex-imaginary numbers referred to the axis of the second system. If instead of bringing the origin of one system into coincidence with the point of the other system the two points had been made to coincide then the origin of the minuend system referred to the axis of the subtrahend system would have represented the difference of the two complex-imaginary numbers.

Logarithms of complex-imaginary numbers possess the property similar to that for ordinary numbers that where three complex-imaginary numbers stand in the relation of two factors and their product, the respective logarithms of these three complex-imaginary numbers stand in the relation of two addends and their sum.

The principal purpose of the chart A is to enable the operator to locate on its surface points representing graphically the logarithms of the complex-imaginary numbers he wishes to employ, to add or subtract these logarithms by pure translational displacement of the chart and to read off the chart the complex-imaginary numbers corresponding to the logarithmic sums or differences graphically obtained which are thereby the products or quotients of the original complex-imaginary numbers employed.

The chart A bears two systems of curves. No two of the curves of the same system intersect, but with a proper understanding as to the identity of the curves it may be said that all the curves of one system are intersected by every curve of the other system. This reticular network of curves, each curve being suitably numbered, forms a curvilinear coordinate reference system, by which is meant that if the number of one curve out of each of the two systems, two numbers in all, be specified, then these two numbers, say "$r$" and "$j$," define the position of a definite point on the chart at the intersection of the two curves; or that if a point be indicated on the chart then the position of this point defines two numbers, "$r$" and "$j$," the numbers of the two curves that intersect at that point. (It is to be understood that while there is a practical limit to the number of curves which can be ruled on the chart A there is no limit to the number of curves that may be supposed to exist between two adjacent physically existent curves of either system so that a point situated between two ruled curves could be identified approximately with an intermediate unruled curve and the corresponding number intermediate to the numbers of two ruled curves on either side, an analogous process to that used in reading any ruled scale to an estimated fraction of the smallest ruled division. The nature of the curvilinear coordinates is such that with a reasonable number of rulings the surface of the chart A becomes divided into many small areas sufficiently approximating squares so that numerical values of the position of a point falling within such a square can readily be esimated in decimal parts of the side of the square).

The two systems of curves on chart A as they appear in the drawing serve to locate points on the chart whose positions graphically represent in the manner hereinbefore explained the logarithms of complex-imaginary numbers. For example, the natural logarithm of the complex-imaginary number 3 plus $i4$ is 1.61 plus $i.928$. The point on chart A at the intersection of curve 3 of one system, hereinafter to be known as the real system, and curve 4 of the other system hereinafter to be known as the imaginary system, is just 1.61 units distant from a straight line (not shown) tangent to the bottom scallops of the network of curves and .928 units distant from the vertical center line of the network of curves. The shape of the curves is such that a similar relationship holds for every other point on the chart, the point in each case referred to the same reference lines just mentioned representing graphically the logarithm of the complex-imaginary quantity corresponding to the numbers on the curves intersecting at that point.

The graphic addition of two such logarithms, that is the multiplication of two complex-imaginary numbers, is accomplished as follows; the chart A is set upon the chart B so that the vertices of the rectangle of reference on chart B correspond with the four extreme corners of the network of curves. This is facilitated in the form of my invention shown in the drawing by the transparent inserts in the border of the chart A which bear small fiducial marks on the side in contact with chart B. These are so placed that when their coincidence with the reference lines on chart B occurs the vertices of the rectangle on chart B are directly under the four corner points of the network of curves. This position of the chart A will hereinafter be known as the "initial position."

Suppose, for example, it is desired to multiply 3 plus $i4$ by .5 plus $i1$, which requires the addition of the logarithms of these two numbers. With the chart A in the initial position set the indicator C so that one of the vertices, say $p$ of the rectangle ruled on the indicators lower surface coincides with curves 3 of the real system and 4 of the imaginery system on chart A. Next, without disturbing the setting of the indicator C translate the chart A so as to bring the intersection of curves 1 real and 0 imaginary at the midpoint of the bottom of the chart (this is the reference origin) under the point $p$ of the indicator. Next, without disturbing the chart A, move the indicator so that the point $p$ corresponds with the intersection of curves $\frac{5}{10}$ real and 1 imaginary, and finally without disturbing the indicator, translate the chart A to the initial position.

In the above process the complex-imaginary logarithm of 3 plus $i4$ has been graphically added to the complex-imaginary logarithm of .5 plus $i1$ in the manner explained hereinbefore as graphical addition. The point $p$ on the indicator now stands directly over a point on the chart A representing the logarithm of the complex-imaginary quantity, the product sought. This is read off directly by noting the numbers of the two curves which intersect beneath the point $p$. In the above case these will be found to be the curves $-2.5$ plus $i7$.

Descriptions hereinafter given will be shortened considerably by the use of such phrases as "set indicator C on dividend" which in reality means "set the indicator C so that one of the vertices $p$ of the rectangle ruled on the indicator's lower surface corresponds with the point representing the logarithm of the dividend, namely, the point at the intersection of the curves of the real and imaginary systems on chart A corresponding in number to the real and imaginary components respectively of the complex-imaginary dividend." It will therefore be understood that in speaking of a point "corresponding to" a given complex-imaginary quantity, what is meant is that the point referred to the curvilinear coordinate system corresponds to the complex-imaginary quantity, though it is understood that in ordinary rectangular coordinates the point corresponds to the logarithm of that complex-imaginary quantity. With this understanding as to shortened terminology the process of performing division of complex-imaginary numbers will now be explained.

Place chart A in initial position. Set indicator C on dividend. Move chart A so that indicator C is over divisor. Set indicator over 1 plus $i0$ on chart A. Return chart A to initial position and the quotient appears under indicator C.

A useful feature of my invention is the ease with which a continued series of operations can be performed. For example, suppose it be required to evaluate the formula $$\frac{T \times U \times V}{W \times X}$$

where the letters of each stand for a complex-imaginary number of the form ($a$ plus $ib$).

The operations are as follows. Place chart A in initial position and set indicator over T. Translate chart A so that W is under indicator. Set indicator over U. Translate chart A so that X is under indicator. Set indicator over V. Return chart A to initial position and read result under indicator. This same problem requires by ordinary methods sixteen operations of multiplication, nine operations of addition, two operations of squaring, and two operations of division. By the so-called modulus-argument method it requires five separate logarithmic divisions, looking up five angles in tables for two trigonometric functions each, looking up five logarithms of natural numbers, summation of ten logarithms and cologarithms, algebraic summation of five angles, looking up two trigonometric functions of one angle, two summations of two logarithms each, and finally looking up two anti-logarithms. It is a very conservative estimate to say that my invention will perform such an operation in one sixth of the time required by any of the existing methods with much smaller chance of error.

Certain of the curves in each system on chart A have their associated numbers printed beside them, these curves being slightly heavier than the rest and bearing the natural numbers from 1 to 10. The intermediate curves may, or may not, be similarly numbered and the intermediate curves themselves as numerous and closely spaced as practicability and cost will permit. The numbers of the curves are printed at their ends which terminate along the top edge of the network and also along the vertical lines which divide the network into four equal and similar areas. Certain of the intermediate curves may also be numbered along the bottom edge of the chart where they end. It is to be understood that my invention is not to be limited to the exact method of placing the numbers here described, any method of associating the proper numbers and curves being permissible.

As the curve spacing becomes closer near the top of the chart certain of the intermediate curves I prefer to stop short of the top to avoid the confusion of lines too closely spaced.

The system of curves to be associated with the real components of the complex-imaginary quantities may be distinguished from the system to be associated with the imaginary components by a difference in the colors of curves and numbers, such as red for imaginary and black for real numbers. My invention is not however restricted to this, or any other, system of coloring, any such system being merely a matter of convenience.

My invention is not restricted at all as to the range of numbers over which it will effect computations, with the single exception that 0 plus $i0$ is excluded. Complex-imaginary numbers having 0 as one component are included in the scope of my invention as are also those having one or more negative components. My invention automatically cares for these signs of quality through any number of continued operations, a characteristic which no other similar device possesses. Any finite complex-imaginary number however large or however small its components, may enter into the computations effected with my invention. This is because the units used in the numbering of the curves may be taken to represent any power of ten desired as .1, 10, 100, etc., with the restriction that the same power of ten must be used for the two components of one and the same complex-imaginary number though different powers of ten may be used for different complex-imaginary numbers in the same computation. When the result of a series of operations is read from chart A the effect of this arbitrary assignment of values to the units makes it necessary to determine the position of the decimal point in the two components of the complex-imaginary result but whatever shift in the position of the decimal point to the right or left is required it will be the same in both the real and imaginary components. This shift can be determined either by a rough check of the work when finished or from a record of the powers of ten for which one unit on the chart has been substituted.

The chart B is slightly more than three times the dimension of the chart A in both length and breadth so that the chart A may be displaced from the initial position by its own length or breadth in any direction.

It is quite evident that certain operations would carry the indicator completely off the chart B after a few succesive shiftings. This difficulty can always be obviated by a means resembling that used on the engineer's slide-rule which consists in shifting the chart A, whenever it becomes necessary, a vertical distance just equal to the height of the network of curves (e. g. from $1+i0$ to $10+i0$), or a horizontal distance just equal to the length of the network of curves, or both, and in such a direction as to return the chart A nearer to the initial position. Such a vertical shifting merely effects the position of the decimal point in the final result being equivalent to multiplication or division by ten while such a horizontal shifting does not effect the result at all being equivalent to one complete revolution of the argument of the complex-imaginary result. A more convenient means of avoiding the last mentioned difficulty is provided in the form of my invention shown in the drawing at Fig. 1. The indicator C which might in its most primitive form consist of a simple point as in Fig. 4 is here modified as shown at C Fig. 1 to a rectangular piece of transparent material, such as celluloid, bearing on the side in contact with chart A two pairs of parallel straight lines or scratches intersecting so as to form a rectangle whose vertices $p$ can be made to coincide with the four extreme corners of the network of curves on chart A. It is evident that the shift or displacement from one corner of the indicator to another is always of such an amount as to effect merely the position of the decimal point in the complex-imaginary result, and therefor the four corners can be used interchangeably as indicators during any series of operations. In reading off the final result one of these corners will surely lie within the central rectangle on chart B and on returning chart A to the initial position the result may be read off under this corner regardless of whether it be the one previously used in any of the operations.

This rectangular form of the indicator serves another purpose in that it affords an easy means of obtaining the modulus and argument of any complex-imaginary number given the real and imaginary components or of performing the reverse operation. The bottom and top edges of chart A bear each a scale of equally spaced divisions of which 360 occupy the entire length corresponding to the length of the network of curves. These divisions correspond to degrees of arc and refer to the arguments of the complex-imaginary quantities. It is to be understood that my invention is not however restricted to this disposition of the divisions. The scale of arguments might for example, be so divided as to represent radians and fractions of radians. By means of the scales, in conjunction with the rectangular form of indicator, the argument of any complex-imaginary number, say K located at a point on the chart A by the intersections of the proper real and imaginary curves, is found by aligning this point vertically with the divisions of the scale of arguments either above or below the point according as the position of the indicator permits. The reading is taken by noting where the vertical side of the indicator rectangle passing through the corner of the indicator used cuts the argument scale.

If this same point on the chart A be aligned horizontally by means of the indicator with a point on any of the five vertical lines which divide the network of curves into four equal parts, the modulus of the complex-imaginary number can be read off on the scale formed by the intersections of the numbered curves of the network with this vertical straight line, the alignment being accomplished in this case with that horizontal side of the indicator rectangle passing through the corner of the indicator used. The advantage of having one set of numbers for the curvilinear coordinates situated near the vertical straight lines is here apparent. The indicator, in order to perform the functions just described, must be provided with means of restricting its motion to a motion of pure translation. Such means are exemplified at $b$ and $c$ in the drawings.

In a great number of cases in practice the known or the desired quantities are not the real and imaginary components of the complex-imaginary number, but rather the modulus and argument, or some function of the argument angle such as the cosine. This is the case in problems pertaining to alternating electrical currents where the modulus corresponds to the magnitude of the current or voltage and the argument corresponds to the phase-angle, while the cosine of the phase-angle may correspond to the power factor.

It is evident that a setting can be made on chart A, given the modulus and argument of a complex quantity, with as much ease as though the real and imaginary components were known. One of the horizontal lines of the indicator is merely set to coincide with the value of the modulus as read off on the scale formed by the intersections of the curves with a vertical straight line on the chart, while one of the vertical lines on the indicator is made to coincide with the value of the argument as read on the argument scale. The corner on the indicator of the vertical and horizontal lines which were employed is then directly over the point of intersection on chart A of the curves corresponding to the real and imaginary components of the imaginary quantity. If this quantity is to be employed in a series of operations the point found can be used immediately without actually reading off the real and imaginary values. The work of setting the indicator in the above instance is facilitated by the construction of rails and slides shown in the drawing at $b$ and $c$ which support and guide its motion. By making these strictly parallel to all the other vertical or horizontal elements of the charts and the indicator, the two settings of the indicator can be made successively and independently without having the motions of the second setting vitiate the accuracy of the first.

By means of the scale $d$ on the edge of indicator C, which is parallel to the argument scale on the chart A and so divided and numbered that cosines of the angle on the argument scale can be read by direct alignment, it is possible to obtain power factors. The cosine of the phase-angle which separates an alternating voltage from the current associated with it is the power factor. This phase-angle on the chart A is proportional to the horizontal distance which separates the point corresponding to the complex-imaginary or symbolic voltage and the point corresponding to the complex-imaginary or symbolic current. By aligning the zero end of the cosine scale with, say the voltage point by means of the proper vertical line on the indicator while placing the indicator so that the current point is under the cosine scale itself, the cosine of the phase-angle may be read off the scale at the latter point, thus giving the power factor. The power factor may equally well be one of the known quantities in setting up a problem, the cosine scale being of equal service in this case.

In certain problems pertaining to transmission lines for alternating currents there occur powers and roots of complex-imaginary quantities. My invention permits of obtaining these by the following method.

With the chart A at, or near, the initial position one corner of the indicator is set on the complex-imaginary number whose root or power is sought. By means of the vertical line on the indicator the argument angle is then read off as already explained and the logarithm of the modulus is read by aligning the point in question horizontally by means of the horizontal line on the indicator with the divisions of a vertical scale of equal parts $f$ to be found at either edge of chart A. In the case of a root these two readings, argument and logarithmic modulus, are then each divided by the index of the root. In the following case of a power, they are each multiplied by the exponent of the power. The values thus obtained are reapplied to their respective scales and the indicator set at the points determined by these new values. The corner of the indicator will then be over the root or power desired, and the value of this complex-imaginary number can be read off the chart A. The multiplication or division referred to must be performed separately in the form of my invention shown in the drawing.

The scale $f$ is numbered from 0 to 1 to correspond with the Briggsian logarithms of numbers 1 to 10 and it is to be understood that readings taken on this scale represent mantissas to which the whole characteristic must be added if necessary. This process is so generally understood that the is no need to explain it here.

The entire numerical natural logarithm of any complex-imaginary number can be obtained by forming a complex-imaginary number whose real component is the reading of the vertical scale $f$ multiplied by 2.3026 (to give natural or Napierian logarithms) and whose imaginary component is the reading of the argument scale multiplied by .01745 to give angular measure in radius. In the design of the chart A the proportions of width to height may be varied without interfering with the spirit or the operation of my invention. However the nature of the curves on chart A is such that if the proper proportions of width to height be observed every curvilinear intersection on the chart will be a "normal" intersection that is the tangents to the two intersecting curves at every point of intersection will be mutually perpendicular. As an intersection defines a point with best definition when it is a normal intersection it is obviously preferable to construct my invention so that this condition will be observed.

The cross and slot device for restricting the motion of chart A upon chart B to a motion of pure translation is shown in Fig. 3. It consists of a cross of metal or other suitable material formed as shown of two arms of sufficient length to permit the latitude of motion necessary for the operation of chart A always maintaining sufficient length of contact in the slots to prevent all rotation of chart A and insure in all positions that the edges and lines of chart A shall remain strictly parallel to the initial position of those edges and lines. To accomplish this the two arms of the cross are very solidly joined at their point of intersection by welding or by shaping the cross of one integral piece of material. The two arms do not lie in the same plane, but are, offset as shown so that the bottom plane or face of one arm coincides with the top face or plane of the other, thus permitting the arms to slide in their respective slots in chart A and B. These slots may, or may not, be lined with metal, but should be of such a material and so made as to insure a good sliding fit with neither binding nor appreciable play at all times for the movement of the arms of the cross.

The charts are of any suitable material not subject to objectionable shrinkage or warpage, and chart A should be of such a material, or should have firmly attached on its upper surface a sheet of such material as will permit of conveniently printing, engraving, or otherwise permanently tracing upon its surface the necessary curves, numbers, scales, etc., herein described.

My invention is in no wise restricted to the particular form of curves shown on chart A in the drawings, although these form an essential feature of one of the most useful forms of my invention. These curves belong to a general class known in mathematics as conformal representations, but never before applied to a calculating device partaking of the nature of my invention. Other curves of this general class can be used in a similar way in my invention to perform various types of mathematical operations with complex-imaginary numbers. To explain this briefly I will here adopt the notation in general use for discussing the functions of a complex variable. The curves shown on the chart A in Fig. 1 represent the conformal transformation in the W-plane of a system of ordinarily rectangular cartesian coordinates in the V-plane following the law of transformation, W=log V. By substituting another law of transformation such for example as W=log (log V), W=log (sin V), W=log (cos V), or merely W=½ log V, other conformal networks would be obtained suitable for special forms of calculation. The last example in particular adapts itself in conjunction with the ordinary chart to the rapid extraction of square roots and squaring of complex-imaginary numbers. In such cases a single apparatus is to be used bearing interchangeable charts which can be attached to, or removed from, the top surface of the slotted base of chart A as the use of other conformal curves than the one shown in the drawing are in reality auxiliary to and in a large measure dependent on this fundamental chart. Such auxiliary charts as those mentioned here have considerable application in problems involving transient and alternating currents in transmission lines and networks.

My invention as above described is capable of considerable simplification to lower its cost of construction at the expense of some convenience in its operation. Fig. 4 is a schematic view of a simplified form of my invention suitable for the use of students or others to whom the cost of the perfected form might be prohibitive. It consists of a chart A similar to the one already described and shown in Fig. 1, but in this case printed on heavy cardboard, a chart B to be used in conjunction with a draughtsman's drawing board of suitable dimensions, and a T-square D, used for insuring a motion of pure translation of the chart A, and finally an indicator C', consisting of a jointed arm in two parts as shown, the part the farthest from the attachment to the board being of transparent material such as sheet celluloid and bearing on its extremity simply a fiducial point for locating and indicating the complex-imaginary numbers. Alignment of this point with the argument, modulus, and logarithmic modulus scales is accomplished by either sliding chart A horizontally against the stationary T-square or by sliding chart and T-square together vertically.

Figure 5:
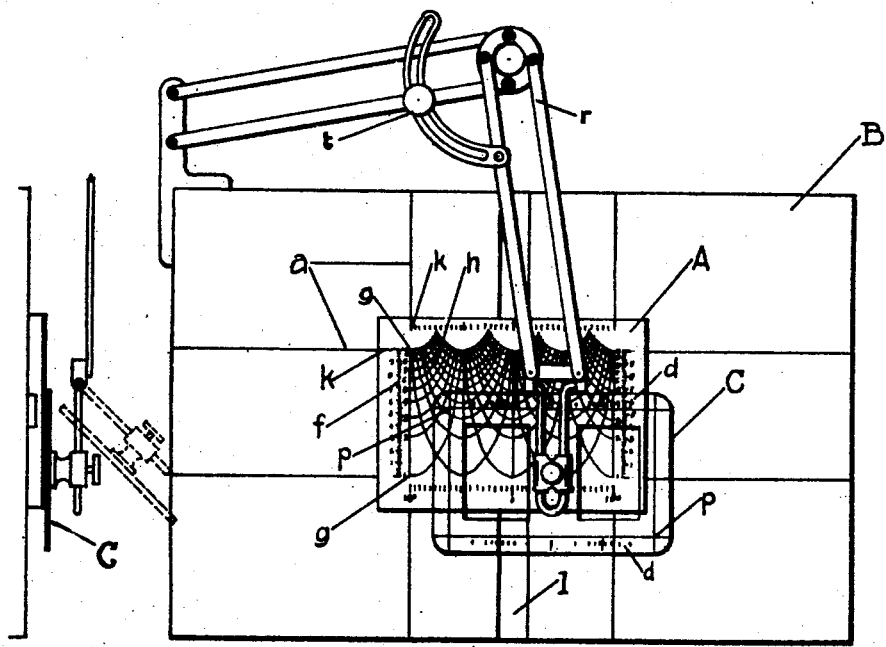
Fig. 5 is an alternative mounting of the indicator.

I have explained my invention by illustrating and particularly describing certain specific embodiments thereof with their modes of employment, but it will be readily understood by those skilled in the art that my invention may be embodied in many other forms than those here shown and described. As an example of an alternative means of insuring uniform and constant orientation of the indicator for instance the principle of interacting parallelogrammic arms may be utilized as shown in Fig. 5. The principle of it is so well known and the adaptation so obvious from the drawing that a detailed description would be superogatory and will be here dispensed with. While either distinct means herein set forth might be used as a separate entity, it is apparent that certain of their elements might be used in a different, but equivalent, combination. For instance, the parallelogrammic arm $r$ with the indicator elements and locking sector $t$ may be attached to the carriage G with slight adaptive alteration in the latter. It is also apparent that any of the above mechanical means of procuring and insuring a movement of pure translation in the matter of the indicator can readily be substituted for the slots $m$, $l$, and co-acting cross-arm $o$ to maintain mutually uniform orientation between charts A and B. Unless specifically restricted to a particular means in the annexed claims it is to be understood that the connotation of the words "adjustable" in referring to the indicator and "movement of pure translation" and similar terms in referring to the relative motions of the charts imply the use of any of the above mechanical means regardless of the modifications and combinations of elements used, such modifications and combinations being deemed mere equivalents. It is therefore to be understood that the embodiments set forth above are subject to any changes or modifications which may be deemed desirable which do not transcend the spirit and scope of my invention.

What I claim as new and desire to secure by Letters Patent in the United States is:

1. A calculating device comprising essentially a reference chart having rectilinear coordinates and movable relative thereto with a movement of pure translation a chart having curvilinear coordinates and having attached to said reference chart an adjustable indicator.

2. A calculating device comprising a reference chart having rectilinear coordinates, and movable relative thereto with a movement of translation a chart having two distinguishable sets of numbered curvilinear coordinates, said chart having fiducial marks serving to establish its initial relation to the reference chart, and an indicator adjustable relative to said chart.

3. A calculating device comprising a reference chart having rectilinear coordinates, and movable relative thereto a curvilinear coordinate chart with fiducial marks and having along the sides thereof scalar markings, said rectilinear coordinate reference chart having attached thereto an adjustable indicator.

4. A calculating device comprising a reference chart having rectilinear coordinates and movable relative thereto with a movement of pure translation a chart base adapted to hold mutually interchangeable charts, and having attached to said rectilinear coordinate reference chart an adjustable indicator.

5. A calculating device comprising a reference chart having rectilinear coordinates and a movable curvilinear chart base, said reference chart and chart base being slotted so as to cooperate with an interacting cross-arm element which is adapted to insure relative motion of pure translation between the rectilinear chart and the movable chart base, said rectilinear reference chart having attached thereto an adjustable indicator.

6. A calculating device comprising a reference chart having rectilinear coordinates and movable relative thereto with a motion of translation a curvilinear coordinate chart with its retaining base, and having an adjustable indicator having thereon scalar and fiducial markings the mounting of the adjustable indicator being fixed relative to the rectilinear coordinate chart.

7. A calculating device comprising a reference chart having rectilinear coordinates and movable relative thereto with a motion of translation a curvilinear coordinate chart with its base, and having an adjustable indicator movable on guides which are integral with a movable carriage the motion of which is at right angles to that of the indicator on the guides, the indicator and carriage of which are capable of being locked to prevent their respective motions, these combined indicator-carriage elements being hinged so that they may be swung away from the chart and returned to the former position relative thereto.

8. In a calculating device a basic rectilinear coordinate reference chart and movable relative thereto a curvilinear coordinate chart having fiducial, uniform, and logarithmic scalar markings, said reference chart and the base of the curvilinear coordinate chart being slotted so as to cooperate with an interacting cross-arm element which insures motion of translation relatively between the charts, and having a movable indicator with fiducial and logarithmic-trigonometric scalar markings, the indicator being mounted on a carriage, both indicator and carriage capable of being locked in their relative positions, and the combined indicator-carriage elements hinged so as to permit of swinging them out of position and returning them thereto.

9. In a calculating device a basic rectilinear coordinate reference chart and movable relative thereto a curvilinear coordinate chart having fiducial, uniform, and logarithmic scalar markings, said reference chart and the base of the curvilinear coordinate chart being slotted so as to cooperate with an interacting cross-arm element which insures motion of translation relatively between the charts, and having a movable indicator with fiducial, uniform, and logarithmic-trigonometric scalar markings, the indicator being attached to a hinged element mounted on the extremity of one of two interacting parallelogrammic arms, the outer end of the other arm being attached to a mounting fixed to the base of the rectilinear coordinate chart and the coacting movement of the parallelogrammic arms insuring a motion uniform orientation of the indicator relative to the charts, the arms having an interacting locking device.

JESSE WILLIAM MUNROE DU MOND.

Witnesses:
G. HAROLD HOPKINS,
ALICE BROWNE.